March 31, 1931.    B. T. WASS    1,798,238
FISHWAY
Filed July 2, 1930
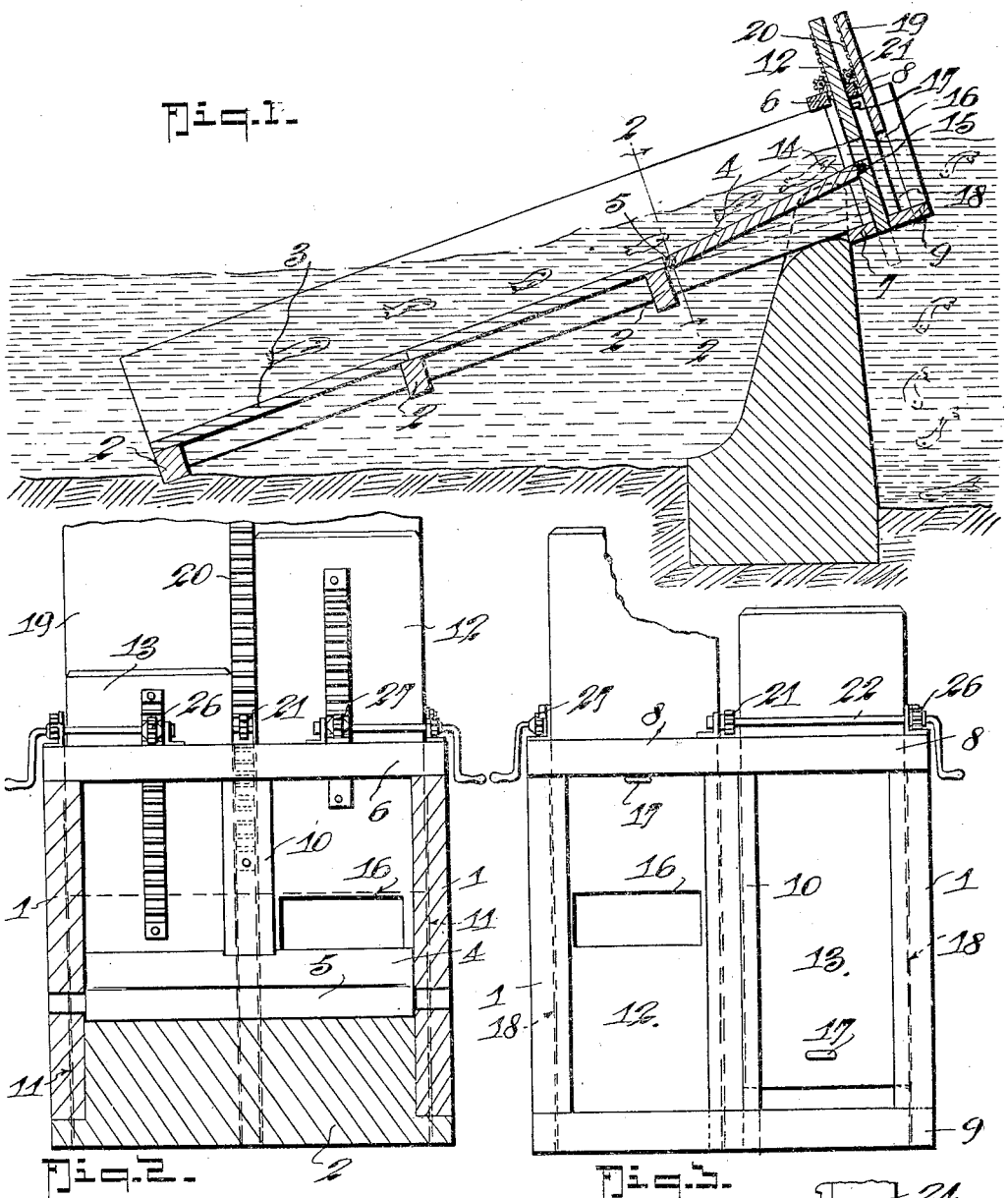
INVENTOR
B. T. Wass.
BY
ATTORNEY Patented Mar. 31, 1931

1,798,238

UNITED STATES PATENT OFFICE

BELA T. WASS, OF CHERRYFIELD, MAINE

FISHWAY

Application filed July 2, 1930. Serial No. 465,422.

My invention relates to the art of fishways for the assistance in the migration of fish over dams and other obstructions in a stream or river, and it particularly has for its object to provide a novel, useful and efficient combination of head gates and floor construction whereby the pressure of water at the head gates may be kept more uniform and whereby the amount of water used depends entirely upon the size of the gates.

Further, it is an object to provide a fishway in which any rise in the water level will not increase the pressure of the water going into the fishway.

Further, it is an object to provide a fishway with a hinge floor section at the high end, which section rises and falls with variations in the water passage over the dam.

Further, it is an object to provide a fishway, the floor of which has a hinged section at the high end and is provided with a gate operated by the rise and fall of the water passing beneath the hinged section, the gate having an opening at the top floor level for the fish to pass through, the arrangement being such that the water for the fishway is always taken from the top of the pond.

Further, it is an object to provide such a fishway as above alluded to in which a manually controlled gate regulates the water which flows under the hinged floor in order to float it, and a manually controlled shut-off gate is located in advance of the other gates and serves as a means to render the fishway operative or inoperative at will.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which :—

Figure 1 is a vertical longitudinal section of a portion of a fishway embodying the invention.

Figure 2 is a cross section on the line 2—2 of Figure 1.

Figure 3 is an end elevation with the float controlled gate raised to maximum position and the shut-off gate removed for purpose of illustration.

Figure 4 is a detail plan view of the gate end of the fishway showing mechanism for mechanically raising and lowering the gates.

Figure 5 is a detail view of the ratchet and pawl device.

In the drawings in which like numerals of reference indicate like parts in all of the figures, 1 represents the side walls of the way, 2 the cross cleats connecting those walls and supporting the floor 3, the latter preferably being made of sections. The upper section 4 of the floor is hinged on an axis 5 so that its free end may rise and fall with the water level.

6 and 8 designate top cleats across the side walls 1 spaced apart as shown while 7 and 9 indicate bottom cleats beneath the cleats 6 and 8, the cleats 7 and 9 having recessed portions to constitute slots for the floating and float controlled gates 12 and 13 respectively.

10 is a vertical central standard having its side walls grooved to correspond with side grooves 11 in the walls 1 to form guideways for the gates 12 and 13.

The free end of the floor section 4 has a lug 14 that fits into a recess 15 in the floating gate 12, the latter having a window 16 above and at the floor level as shown.

Suitable stops 17 are provided on the gates 12 and 13 to limit their range of movement.

18 are the shut-off gate grooves in the side walls 1 and they receive and form guides for the shut-off gate 19.

Any suitable means may be provided for controlling the gates and the floor. For purposes of illustration I have indicated a rack 20 on the shut-off gate which meshes with a pinion 21 on a shaft 22 operated by a crank 23 and held in its adjusted positions by check pawl 24 and ratchet 25.

A similar mechanism 26 may be provided for the gate 13 and a similar mechanism 27 for the gate 12.

When it is desired that the gate 12 be operated automatically the pawl of the pawl and ratchet part of the mechanism 27 is thrown back out of engagement with the ratchet, but when it is desired that the gate be operated mechanically the pawl is left in engagement with its ratchet so as to hold the gate 12 in any of its adjusted positions.

From the foregoing, it will be seen that by means of the gate 19 the operativeness or inoperativeness of the fishway may be effected. By raising and lowering the gate 13 the water passing under and over the hinged section of the floor may be regulated so that the hinged section of the floor will have its free end floated in the water over the dam so that water passing over the floor may be taken always from the top of the pond.

Another object of the gate 13 is that when the water is very low in the pond, so low that the window in the gate 12 does not fill to capacity, the gate 13 may be raised, thus keeping the normal supply of water in the fishway.

In building the fishways they are set down into the dam so that at the mean low water level there will be eight inches of water in the window. At such times as the water is low, the gate 13 is raised and the two gates will then give the normal head.

From the foregoing description, taken in connection with the accompanying drawing, it is thought the construction, operation and advantages of my invention will be clear to those skilled in the art to which it relates.

What I claim is:

1. In fishways, side walls and a bottom wall, the latter having a hinged end section, gates controlling the water delivered to the hinged section and maintaining its free end floating, and a gate with an opening at the floor level movable up and down with said free end.

2. In fishways, side walls and a sectional bottom wall, means hinging the inner end of the high section of said bottom wall, a float control gate adjacent the free end of said high section, a floating gate also adjacent the free end of said high section and connections between the end of said high section and said floating gate to cause the two to rise and fall in unison, said floating gate having a window in it above the floor.

3. In fishways, side walls and a sectional bottom wall, means hinging the inner end of the high section of said bottom wall, a float control gate adjacent the free end of said high section, a floating gate also adjacent the free end of said high section and connections between the end of said high section and said floating gate to cause the two to rise and fall in unison, said floating gate having a window in it above the floor, and means to actuate said float control gate.

4. In fishways, side walls and a sectional bottom wall, means hinging the inner end of the high section of said bottom wall, a float control gate adjacent the free end of said high section, a floating gate also adjacent the free end of said high section and connections between the end of said high section and said floating gate to cause the two to rise and fall in unison, said floating gate having a window in it above the floor, and a shut-off gate mounted between said walls in advance of said first mentioned gate.

5. In fishways, side walls and a sectional bottom wall, means hinging the inner end of the high section of said bottom wall, a float control gate adjacent the free end of said high section, a floating gate also adjacent the free end of said high section and connections between the end of said high section and said floating gate to cause the two to rise and fall in unison, said floating gate having a window in it above the floor, and means to adjust the positions of said float control and said shut-off gates.

6. In fishways, side walls and a sectional bottom wall, means hinging the inner end of the high section of said bottom wall, a float control gate adjacent the free end of said high section, a floating gate also adjacent the free end of said high section and connections between the end of said high section and said floating gate to cause the two to rise and fall in unison, said floating gate having a window in it above the floor, a shut-off gate mounted between said walls in advance of said first mentioned gate, and means to adjust the positions of said float control and said shut-off gates.

7. In fishways, a pair of side walls, cross cleats connecting said walls, a floor supported over said cleats, said floor having a hinged section located at one end of the way, a vertical standard and top and bottom cleats located adjacent the free end of said hinged section, said side walls and said standard having vertical guideways, a pair of gates mounted between said standard and side walls in said guideways, one of said gates having a window, and means connecting said gate that has the window with said hinged section of the floor to rise and fall with it.

8. In fishways, a pair of side walls, cross cleats connecting said walls, a floor supported over said cleats, said floor having a hinged section located at one end of the way, a vertical standard and top and bottom cleats located adjacent the free end of said hinged section, said side walls and said standard having vertical guideways, a pair of gates mounted between said standard and side walls in said guideways, one of said gates having a window, and means connecting said gate that has the window with said hinged section of the floor to rise and fall with it, said walls having a second set of guideway grooves, and a shut-off gate located in said second set of guideway grooves.

9. In fishways, a pair of side walls, cross cleats connecting said walls, a floor supported over said cleats, said floor having a hinged section located at one end of the way, a vertical standard and top and bottom cleats located adjacent the free end of said hinged section, said side walls and said standard having vertical guideways, a pair of gates mounted between said standard and side walls in said guideways, one of said gates having a window, means connecting said gate that has the window with said hinged section of the floor to rise and wall with it, and means to adjust the positions of said gates with respect to one another and to the hinged section.

10. In fishways, a pair of side walls, cross cleats connecting said walls, a floor supported over said cleats, said floor having a hinged section located at one end of the way, a vertical standard and top and bottom cleats located adjacent the free end of said hinged section, said side walls and said standard having vertical guideways, a pair of gates mounted between said standard and side walls in said guideways, one of said gates having a window, means connecting said gate that has the window with said hinged section of the floor to rise and fall with it, said side walls having a second set of guideway grooves, a shut-off gate located in said second set of guideway grooves, and means to adjust the positions of said gates with respect to one another and to the hinged section.

BELA T. WASS.